(12) United States Patent
Tang

(10) Patent No.: US 9,024,822 B2
(45) Date of Patent: May 5, 2015

(54) HOUSING ASSEMBLY AND ELECTRONIC DEVICE USING THE SAME

(75) Inventor: Zi-Ming Tang, Shenzhen (CN)

(73) Assignees: Fu Tai Industry (Shenzhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 993 days.

(21) Appl. No.: 12/979,468

(22) Filed: Dec. 28, 2010

(65) Prior Publication Data

US 2012/0133560 A1 May 31, 2012

(30) Foreign Application Priority Data

Nov. 29, 2010 (CN) .......................... 2010 1 0564647

(51) Int. Cl.
*H01Q 1/24* (2006.01)
*G06F 1/16* (2006.01)
*H04M 1/02* (2006.01)
*H01Q 1/38* (2006.01)

(52) U.S. Cl.
CPC ............ *G06F 1/1698* (2013.01); *G06F 1/1626* (2013.01); *G06F 1/1637* (2013.01); *H01Q 1/243* (2013.01); *H04M 1/0249* (2013.01); *H01Q 1/38* (2013.01)

(58) Field of Classification Search
None
See application file for complete search history.

(56) References Cited

U.S. PATENT DOCUMENTS

| 2002/0192998 | A1* | 12/2002 | Noro | 439/497 |
| 2008/0055166 | A1* | 3/2008 | Kobayashi | 343/702 |
| 2008/0316121 | A1* | 12/2008 | Hobson et al. | 343/702 |

FOREIGN PATENT DOCUMENTS

| CN | 101573009 A | 11/2009 |
| CN | 101621118 A | 1/2010 |
| CN | 201491423 U | 5/2010 |

* cited by examiner

*Primary Examiner* — Graham Smith
(74) *Attorney, Agent, or Firm* — Novak Druce Connolly Bove + Quigg LLP

(57) ABSTRACT

An housing assembly includes an outer housing, an antenna cover, a support member, and an elastic member. The outer housing defines an antenna opening. The antenna cover is positioned in the antenna opening of the outer housing. The support member is positioned in the outer housing. The support member forms an assembly portion for receiving the antenna module. The assembly portion is aligned with the antenna opening. The elastic member is positioned between the support member and the antenna cover, generating elastic force snugly fixing the antenna cover to the outer housing. An electronic device using the housing assembly is also provided.

16 Claims, 4 Drawing Sheets

HOUSING ASSEMBLY AND ELECTRONIC DEVICE USING THE SAME

BACKGROUND

1. Technical Field

The present disclosure relates generally to housing assemblies, more particularly, to a housing assembly for an electronic device.

2. Description of Related Art

An electronic device such as a mobile phone uses an antenna to receive signals from a communication base station. The antenna is either internal or external. The internal antenna is positioned in the electronic device to maintain a small size.

The electronic device using the internal antenna defines an antenna opening in a housing thereof. A plastic antenna cover is positioned in and closes and opens the antenna opening. The internal antenna receives and sends signals through the antenna opening and the antenna cover. The antenna cover is often fixed to the housing by screws, which can consume considerable time during assembly and disassembly, be unsightly, and the antenna cover may not align with the housing. Therefore, the appearance of the electronic device can be compromised.

Therefore, there is room for improvement within the art.

BRIEF DESCRIPTION OF THE DRAWINGS

The components in the drawings are not necessarily drawn to scale, the emphasis instead placed upon clearly illustrating the principles of the present disclosure. Moreover, in the drawings, like reference numerals designate corresponding parts throughout the several views.

DETAILED DESCRIPTION

Figure 1:
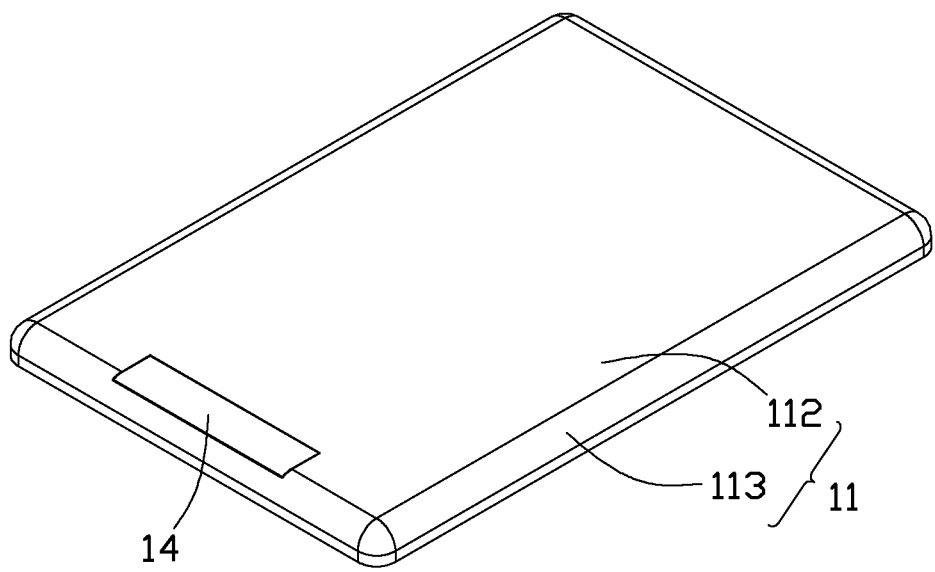
FIG. 1 is an isometric view of an embodiment of an electronic device.
Figure 2:
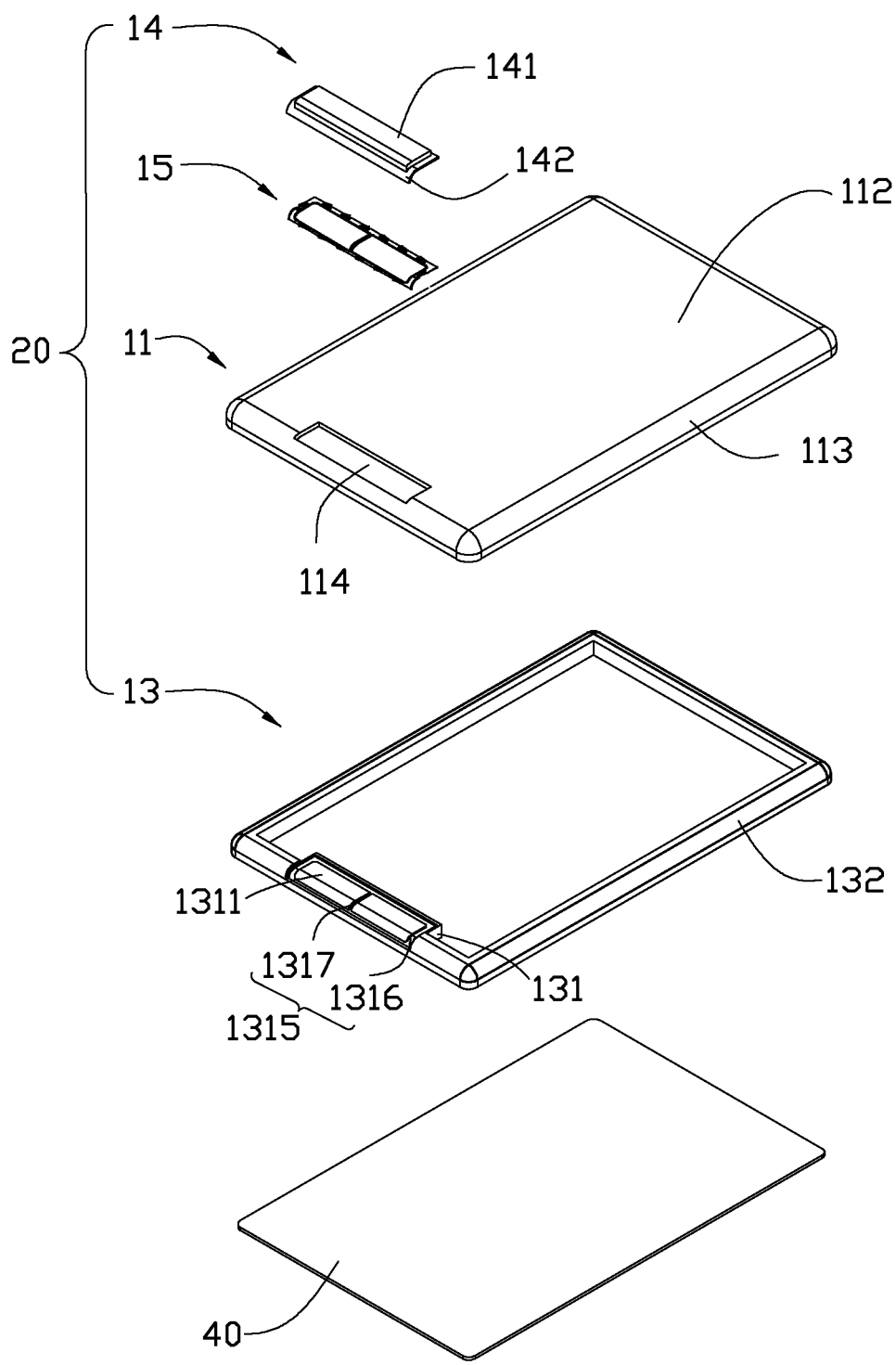
FIG. 2 an exploded, isometric view of a housing assembly of the electronic device of FIG. 1.
Figure 3:
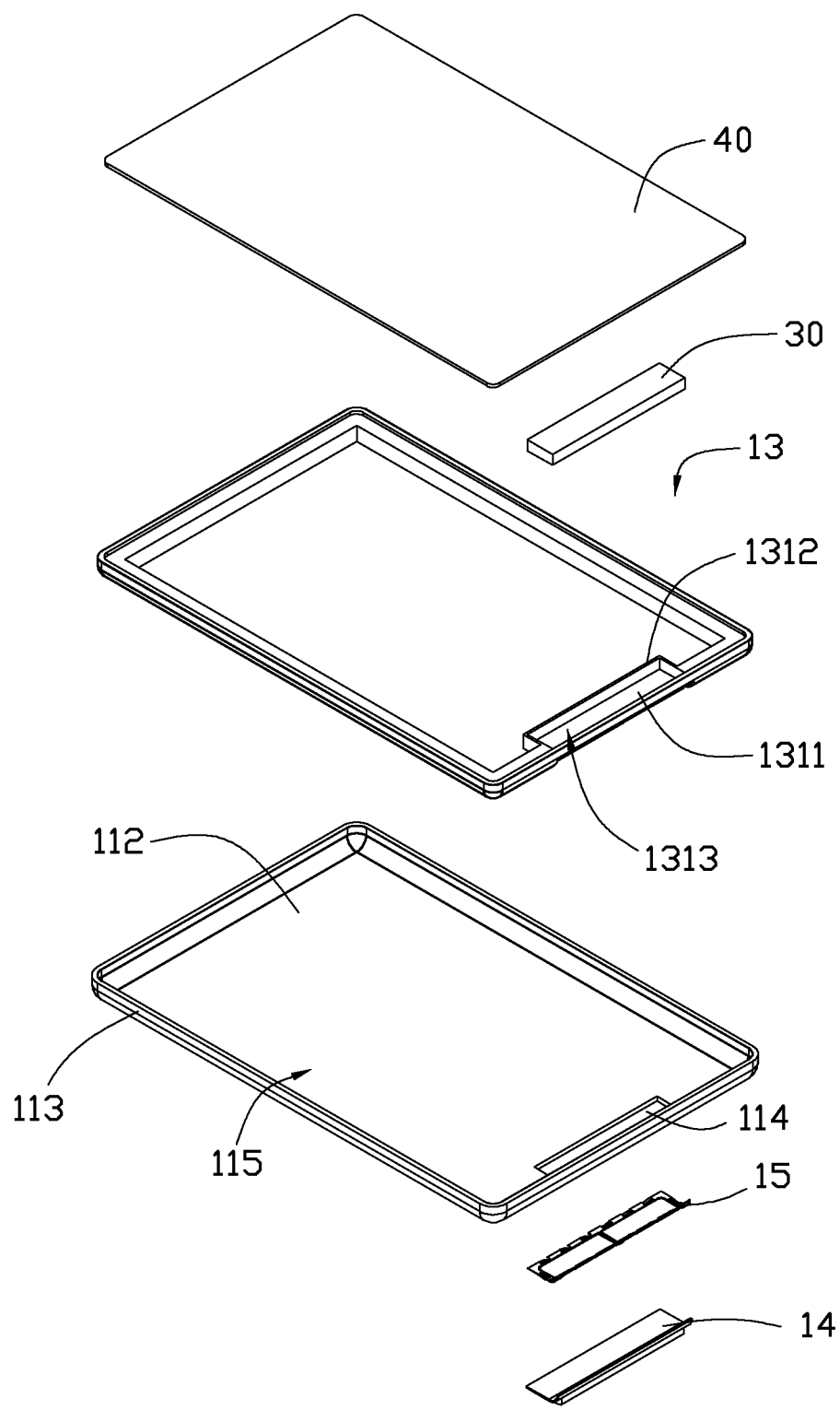
FIG. 3 is similar to FIG. 2, but viewed from another angle.

A definition that applies throughout this disclosure will now be presented. The term "substantially" is defined to be essentially conforming to the particular dimension, shape or other feature that substantially modifies, such that the component need not be exact. For example, substantially cylindrical means that the object resembles a cylinder, but can have one or more deviations from a true cylinder. Referring to FIGS. 1 through 3, an embodiment of an electronic device 100 includes a housing assembly 20, an antenna module 30, and a touch panel 40. The antenna module 30 and the touch panel 40 are positioned in the housing assembly 20. In the illustrated embodiment, the electronic device 100 is a tablet computer.

A housing assembly 20 includes an outer housing 11, a support member 13, an antenna cover 14, and an elastic member 15 between the support member 13 and the antenna cover 14. The support member 13, the antenna cover 14, and the elastic member 15 are positioned in the outer housing 11.

The outer housing 11 includes a bottom plate 112 and a side plate 113 extending from an edge thereof. The bottom plate 112 and side plate 113 cooperatively define a receiving groove 115. The antenna module 30, the touch panel 40, and the support member 13 are received in the receiving groove 115 of the outer housing 11. The outer housing 11 defines an antenna opening 114. In the illustrated embodiment, the antenna opening 114 is defined in an end of the bottom plate 112 adjacent to the side plate 113. The outer housing 11 is metal, such as aluminum, magnesium alloy, titanium or stainless steel. A thickness of the outer housing 11 is less than or equal to about 1.2 millimeters (mm).

The support member 13 forms an assembly portion 131 for receiving the antenna module 30. The support member 13 is adhered to or tightly fastened to the outer housing 11, with the assembly portion 131 corresponding to the antenna opening 114. In the illustrated embodiment, the support member 13 is a substantially rectangular frame. The support member 13 is plastic, so that a signal sent by the touch panel 40 can transmit through the support member 13 and transmit via the antenna opening 114.

Referring to FIG. 3 again, the assembly portion 131 includes a bottom surface 1311 and a sidewall 1312 extending from an edge of the bottom surface 1311. The bottom surface 1311 and the sidewall 1312 cooperatively define an assembly groove 1313. When the assembly portion 131 is fixed to the outer housing 11, the bottom surface 1311 closes the antenna opening 114. The bottom surface 1311 further defines a positioning groove 1315 (see FIG. 2) for the elastic member 15.

The antenna cover 14 includes a main portion 141 corresponding to the antenna opening 114 and a flange 142 extending from an edge of the main portion 141. In the illustrated embodiment, the antenna cover 14 is plastic. The elastic member 15 is positioned in the positioning groove 1315, and the antenna cover 14 is received in the antenna opening 114, so that the elastic member 15 can generate an elastic force securely fitting the antenna cover 14 with the outer housing 11.

Figure 4:
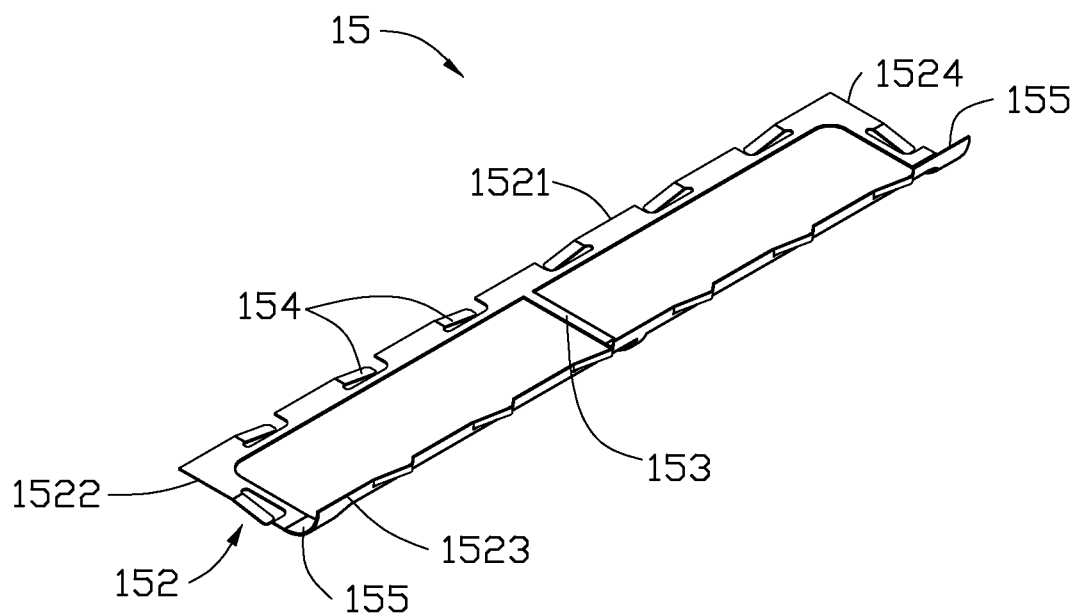
FIG. 4 is an enlarged, isometric view of an elastic member of the housing assembly of FIG. 3.

Referring to FIG. 4, in the illustrated embodiment, the elastic member 15 is metal. The elastic member 15 includes a substantially rectangular frame 152 having four sidebars including a first sidebar 1521, a second sidebar 1522, a third sidebar 1523 and a fourth sidebar 1524 and a connecting portion 153 in a middle portion of the frame 152 connecting the first side bar 1521 and third sidebar 1523 of the frame 152. The first sidebar 1521 is connected to the second sidebar 1522 and fourth sidebar 1524 at right angles to the respective ends of the first sidebar 1521. The third sidebar 1523 is connected to the second sidebar 1522 and fourth sidebar 1524 at right angles to the respective ends of the fourth sidebar 1524. The second sidebar 1522 and the fourth sidebar 1524 have curved portions 155. The frame 152 includes a plurality of elastic support portions 154 formed by punching The positioning groove 1315 includes a substantially rectangular groove 1316 corresponding to the frame 152, and a connecting groove 1317 corresponding to the connecting portion 153, so that the elastic member 15 is easily assembled to the positioning groove 1315 of the support member 13.

In assembly of the housing assembly 20, the antenna cover 14 is positioned in the antenna opening 114 of the outer housing 11 with the flange 142 attached to the inner surface of the outer housing 11. The elastic member 15 is positioned in the positioning groove 1315 of the support member 13. The support member 13 is fixed to the outer housing 11. When elastic support portions 154 of the elastic member 15 resist the antenna cover 14, elastic force generated thereby snugly fits the antenna cover 14 to the outer housing 11. Correspondingly, no height difference occurs between the antenna cover 14 and the outer housing 11. After the housing assembly 20 is assembled, the antenna module 30 is positioned in the assembly groove 1313 of the support member 13. The touch panel 40 is positioned in the receiving groove 115 of the outer housing 11, and attached to the support member 13. In use, the antenna module 30 receives and sends signals through the antenna opening 114 and the antenna cover 14.

It is believed that the present embodiments and their advantages will be understood from the foregoing description, and it will be apparent that various changes may be made thereto without departing from the spirit and scope of the disclosure or sacrificing all of its material advantages.

What is claimed is:

1. A housing assembly for positioning an antenna module, comprising:
    an outer housing defining an antenna opening;
    an antenna cover positioned in the antenna opening of the outer housing;
    a support member positioned in the outer housing, the support member comprising an assembly portion receiving the antenna module, the assembly portion being aligned with the antenna opening; and
    an elastic member positioned between the support member and the antenna cover, thereby generating an elastic force to drive the antenna cover tightly to the outer housing, wherein the elastic member forms a plurality of elastic support portions by punching, the elastic member comprises a frame having four side bars including a first sidebar, a second sidebar, a third sidebar and a fourth sidebar and a connecting portion connecting the first and third sidebars of the frame, wherein the first sidebar is connected to the second sidebar and fourth sidebar at right angles to the respective ends of the first sidebar, the third sidebar is connected to the second sidebar and fourth sidebar at right angles to the respective ends of the fourth sidebar and the second and fourth sidebars having curved portions.

2. The housing assembly of claim 1, wherein the antenna cover comprises a main portion received in the antenna opening, and a flange extending from an edge of the main portion, the flange being attached with the outer housing.

3. The housing assembly of claim 1, wherein the support member defines a positioning groove positioning the elastic member.

4. The housing assembly of claim 1, wherein the support member is a substantially rectangular frame.

5. The housing assembly of claim 1, wherein the assembly portion comprises a bottom surface and a sidewall extending from an edge of the bottom surface, the bottom surface and the sidewall cooperatively defining an assembly groove receiving the antenna module.

6. The housing assembly of claim 1, wherein the outer housing is made of metal.

7. The housing assembly of claim 1, wherein the support member is made of plastic.

8. The housing assembly of claim 1, wherein a thickness of the outer housing is less than or equal to about 1.2 mm.

9. An electronic device, comprising:
    an antenna module; and
    a housing assembly for positioning the antenna module, the housing assembly comprising:
    an outer housing defining an antenna opening;
    an antenna cover positioned in the antenna opening of the outer housing;
    a support member positioned in the outer housing, the support member comprising an assembly portion being aligned with the antenna opening, the antenna module received in the assembly portion; and
    an elastic member positioned between the support member and the antenna cover, thereby generating an elastic force to drive the antenna cover tightly to the outer housing, wherein the elastic member forms a plurality of elastic support portions by punching, the elastic member comprises a frame having four side bars including a first sidebar, a second sidebar, a third sidebar and a fourth sidebar and a connecting portion connecting the first and third sidebars of the frame, wherein the first sidebar is connected to the second sidebar and fourth sidebar at right angles to the respective ends of the first sidebar, the third sidebar is connected to the second sidebar and fourth sidebar at right angles to the respective ends of the fourth sidebar and the second and fourth sidebars having curved portions.

10. The electronic device of claim 9, further comprising a touch panel received in the outer housing and positioned on the support member.

11. The electronic device of claim 9, wherein the antenna cover comprises a main portion received in the antenna opening, and a flange extending from an edge of the main portion, the flange being attached with the outer housing.

12. The electronic device of claim 9, wherein the support member defines a positioning groove for positioning the elastic member.

13. The electronic device of claim 9, wherein the support member is a substantially rectangular frame.

14. The electronic device of claim 9, wherein the assembly portion comprises a bottom surface and a sidewall extending from an edge of the bottom surface, the bottom surface and the sidewall cooperatively defining an assembly groove receiving the antenna module.

15. The electronic device of claim 9, wherein the outer housing is made of metal, and the support member is made of plastic.

16. The electronic device of claim 9, wherein a thickness of the outer housing is less than or equal to about 1.2 mm.

* * * * *

UNITED STATES PATENT AND TRADEMARK OFFICE
CERTIFICATE OF CORRECTION

PATENT NO. : 9,024,822 B2  
APPLICATION NO. : 12/979468  
DATED : May 5, 2015  
INVENTOR(S) : Zi-Ming Tang Page 1 of 1

It is certified that error appears in the above-identified patent and that said Letters Patent is hereby corrected as shown below:

On the title page

Please replace item (73) regarding "Assignees" with the following:

(73) Assignees: Fu Tai Hua Industry (Shenzhen) Co., Ltd., Shenzhen (CN);
Hon Hai Precision Industry Co., Ltd., New Taipei (TW).

Signed and Sealed this
First Day of December, 2015

Michelle K. Lee
*Director of the United States Patent and Trademark Office*